United States Patent [19]

Grose

[11] 3,890,998

[45] June 24, 1975

[54] CONTROL VALVE

[76] Inventor: Ansel B. Grose, 8 Mt. Vernon St., Stoneham, Mass. 02180

[22] Filed: Aug. 23, 1973

[21] Appl. No.: 390,872

[52] U.S. Cl. ............ 137/436; 137/449; 137/DIG. 2
[51] Int. Cl............................................ F16k 31/26
[58] Field of Search ............ 251/118, 339, 333, 124; 137/449, 436, 444, 533, 17, 11, DIG. 2

[56] References Cited
UNITED STATES PATENTS

| | | | |
|---|---|---|---|
| 1,115,256 | 10/1914 | Torbert.......................... | 137/DIG. 2 |
| 1,323,631 | 12/1919 | Hansen.......................... | 137/DIG. 2 |
| 1,796,443 | 3/1931 | Da Costa .......................... | 137/449 |
| 2,724,404 | 11/1955 | Kass.............................. | 137/449 X |
| 3,011,515 | 12/1961 | Kravagna........................ | 137/449 X |
| 3,180,354 | 4/1965 | Grose............................. | 137/449 X |

*Primary Examiner*—Martin P. Schwadron
*Assistant Examiner*—Robert J. Miller
*Attorney, Agent, or Firm*—Aaron Tushin

[57] ABSTRACT

A control valve for controlling the flow of fluid to a float chamber, and having an internal passage, a small ball valve member for preventing passage of fluid in one direction through the internal passage, a generally conical surface portion surrounding said small ball valve, a large operating plunger ball engaging said small ball valve member, and a plurality of inwardly turned prongs to limit outward movement of the plunger ball, to provide spaced openings between the prongs for passage of fluid to wash and flush the valve parts and to provide point contact supports for the plunger ball for easy and dependable operation, and to provide for a fluid discharge to the float chamber which will cause a minimum of turbulence.

1 Claim, 5 Drawing Figures

PATENTED JUN 24 1975　　　SHEET 2　　　3,890,998

CONTROL VALVE

FIELD OF THE INVENTION

Fluid control valves especially for use with carburetors wherein the valve is controlled by a float in the carburetor chamber and the parts are so related as to operate with precision and efficiency over long periods of time.

DESCRIPTION OF THE PRIOR ART

This invention is an important improvement in the valve shown in my prior U.S. Pat. No. 3,424,431, filed Jan. 28, 1969. In this patented valve structure, fuel is supplied from the usual fuel pump to pass through a float operated ball check valve into a float chamber containing a pool of liquid fuel. A small ball is used for the check valve and a second larger plunger ball is used to open and close the small ball check valve. A generally conical surface provides a chamber surrounding the small valve member and this chamber merges into a larger cylindrical chamber surrounding the larger plunger ball. The outward movement of the plunger ball is limited by an inwardly turned circular lip or flange. Radial openings are provided around the large plunger ball for passage of the fuel as it is admitted to the float chamber.

Various disadvantages have been experienced in the operation of this prior art valve structure. Firstly, the fuel that is expelled from the radial openings splashes outwardly and causes turbulence which results in leakage and loss of fuel from the float chamber. Secondly, particles of foreign matter which may escape into the fuel inlet system may cause improper seating of the ball valve member. These particles, if not flushed out, may also result in an abrading effect on the large plunger ball and on the flange which limits outward movement of the plunger ball. Also, the circular shape of the turned in flange which limits movement of the plunger ball may at times cause sluggish operation of the plunger ball. The above problems reduced the functioning efficiency of the prior art valve.

SUMMARY OF THE INVENTION

It will be seen from the following description that the present invention has been directed to greatly improving the operation of the prior art valve by so constructing and forming certain parts of the valve to eliminate the difficulties pointed out above.

This is accomplished by a special design and formation of the fuel outlet passages from the valve which, after careful experiment, research and development, has been found to provide a cure for these difficulties.

These fuel outlet passages have been improved by closing an omitting the prior art radial passages surrounding the plunger ball and by redesigning the flange which limits the outward movement of the plunger ball. Instead of this flange for limiting plunger ball movement, a series of turned in prongs have been provided, six being used in this example, but it is to be understood that any desired number of prongs may be used.

The spaces between these prongs provide passages for the discharge of liquid into the float chamber. Being generally in line with the direction of flow of fuel around and across the valve and plunger balls, it has been found that this arrangement of passages results in a brisk washing and flushing action which insures that any foreign particles will not adhere to and thus damage any of the balls or seats of the valve.

An additional important result of this arrangement is that the flow of fuel through these passages is downward and not outward. This results in much less splashing and turbulence than in the prior art valve. This is exceedingly important, because it has been found that this splashing and turbulence causes loss of gasolene from the float chamber, and when this occurs in an automobile carburetor, it results in the consumption of more gasolene per mile of travel and more air pollution.

Also, this novel prong structure, due to the point contacts with the plunger ball, permit of easy and rapid functioning of the plunger ball, thus eliminating sluggish movement of the ball which may occur in the prior art valve.

DESCRIPTION OF THE INVENTION

Figure 1:
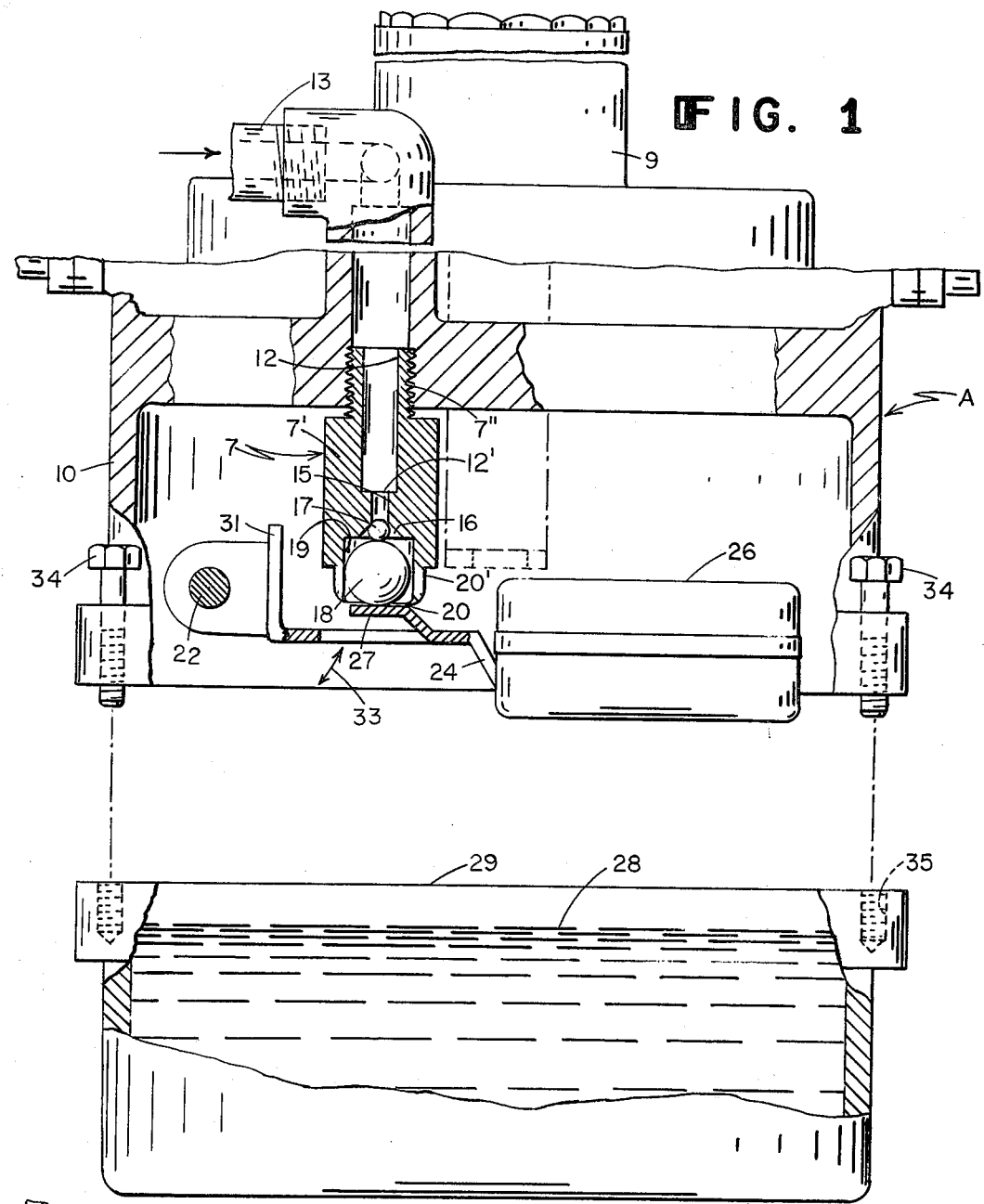
FIG. 1 illustrates an embodiment of the invention installed in a commercial carburetor, wherein parts of the carburetor are shown in exploded relationship, and significant parts of the valve and carburetor are shown in cross section.

As illustrated in the drawings, the valve 7 of the invention is shown installed in a commercial type of carburetor A having a fuel inlet tube 13 through which fuel is supplied under pressure, and upper housing portion 9, an upper float chamber portion 10 and a lower float chamber portion 29. During normal operation, a pool of fuel 28 will be present in the float chamber. In final assembly the float chamber portion 29 shown separated in FIG. 1, will be bolted to the upper float chamber portion 10 by bolts 34 extending into threaded holes 35. (See FIG. 2)

The valve 7 is provided with an externally hexagonal valve body 7' having a threaded boss 7" extending into a fuel inlet duct from inlet tube 13. A central longitudinal passage is provided through the valve body 7, comprising an upper passageway having an inlet portion 12 and a reduced diameter portion 15, a generally conical portion 16 and a larger portion 19, the internal surface of which is hexagonal.

Figure 3:
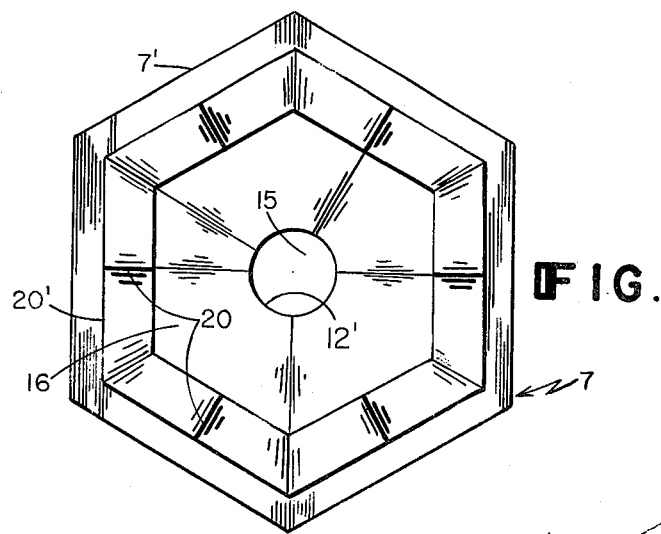
FIG. 3 is a bottom plan view of the valve body with both ball members omitted and before the prongs have been bent inwardly.
Figure 4:
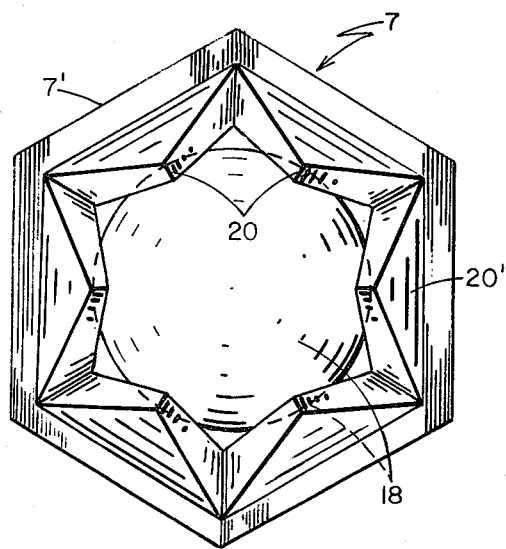
FIG. 4 is a bottom plan view similar to FIG. 3 but showing the large plunger ball member in place and the retaining prongs bent inwardly.
Figure 5:
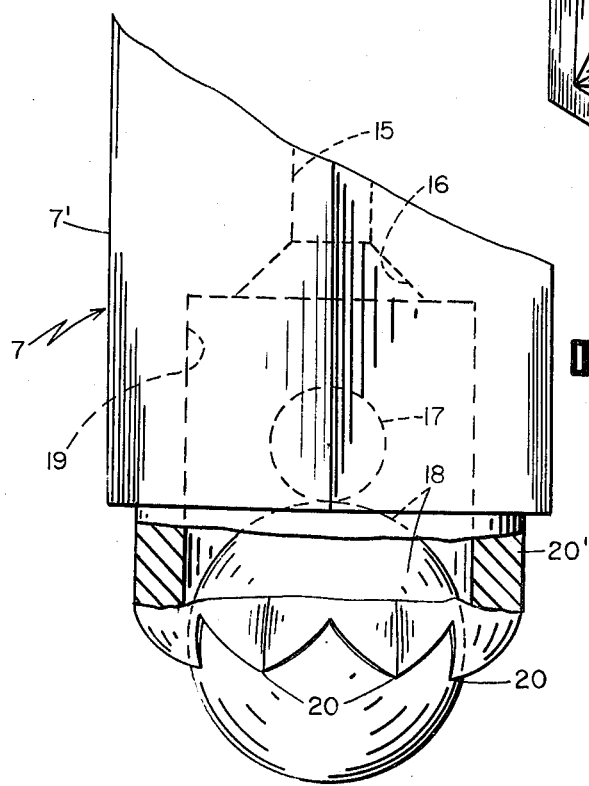
FIG. 5 is an elevation of the significant parts of the valve per se, showing the engagement of the prongs with the plunger ball.

The external surface of valve body 7' is hexagonal in shape to provide a surface for the application of a wrench. Extending from the main hexagonal body portion 7' is another hexagonal extension portion 20' of reduced size, terminating in pointed prongs 20 which are slightly bent inwardly. FIG. 3 shows these prongs in an intermediate stage of manufacture, before being bent inwardly. The hexagonal shape of the extension portion 20' is to expedite the formation of the prongs 20 with a routing tool in the manufacturing operation.

Located in the conical valve passage portion 16 is a small ball valve member 17. In closed position, this ball valve member seats against the end of the small valve passage 15 to close the passage, the ball valve member 17 being slightly larger than passage 15.

A ball shaped plunger 18 is located in the internally hexagonal passage 19. The movement of this ball in passage 19 is limited by the inwardly turned prongs 20. Note that there is only a point contact between the ball 18 and the prongs.

The carburetor A contains the conventional float 26 connected to arm 24 which has a bent up portion 31 provided with ears pivoted on pivot pin 22. A tab 27 struck out from arm 24 is in position to engage the valve operating plunger ball 18.

Figure 2:
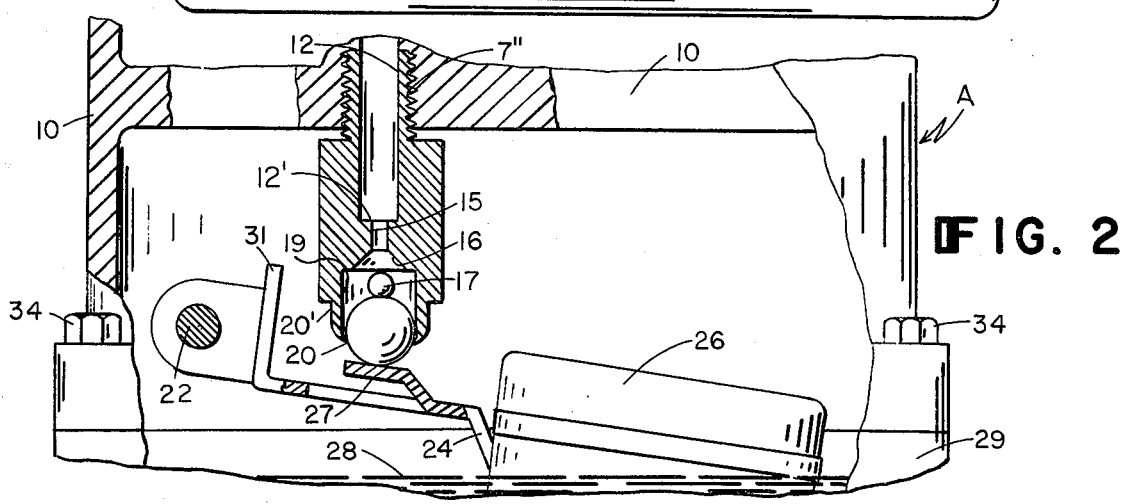
FIG. 2 is a fragmentary partially sectional view of the valve construction illustrated in FIG. 1 showing it in open position and in assembled relation with the float and its associated parts.

In operation, fuel under pressure from inlet tube 13 enters passage 12 of the valve 7, flowing through passages 12' 16, 19 and between prongs 20 to the float chamber 29 below. During this time the float 26, which moves about pivot 22 as shown by the arrowheads 33 in FIG. 1, is in a lowered position due to gravity, and the balls 18 and 17 are in a lowered position shown in FIG. 2. As the float chamber fills with fuel, the float 26 is raised until the valve ball 17 is seated against the circular end of passage 15, by pressure exerted through tab 27, plunger ball 18 and valve ball 17. A slight drop in fuel level will lower float 26, thus lowering valve 17 and permitting fuel to be guided outwardly by the conical portion 16 and to flow over the balls and seats, then downwardly between the prongs 20 to the float chamber. The disposal and arrangement of the outlet passages between prongs 20 causes a washing and flushing action which rids all surfaces of foreign matter and any particles which may damage the surfaces. In practical use, it has been found that splashing and turbulence in the float chamber is minimized, resulting in an unexpected efficiency and economy in carburetor operation.

Although one specific embodiment of the invention has been illustrated, it is to be understood that various changes may be made without departing from the spirit of the invention.

Having thus described the invention and illustrated its use, what is claimed as new and what is desired to be secured by letters patent is:

1. In a fuel control valve for use with a carburator having a float chamber;
 a main body portion having a central longitudinal passage comprising;
 an upper passageway;
 a generally conical passageway having a small end and a large end extending from said upper passageway and merging therewith at its small end;
 an extension of reduced size on the main body portion having an enlarged passage extending from the conical passageway at its large end;
 a small ball valve member in said enlarged passage;
 a ball-shaped plunger in the enlarged passage in engagement with and supporting the small ball valve member;
 said extension having inwardly turned prongs at its outer end engaging said plunger member and limiting its outer movement and providing passages between the prongs for fuel flow, whereby during passage of fuel a brisk washing and flushing action is accomplished, and splashing and turbulence in the float chamber is minimized, and said engaging is by point contact;
 said extension being of hexagonal configuration on both its inner and outer surfaces, thus providing prongs with flat inner and outer surfaces to expedite inward deflection thereof;
 the inner surfaces of said hexagonal extension being closely adjacent said ball shaped plunger providing a guide portion to guide it in a straight path while allowing paths for unimpeded flow of fuel between said guide portions.

* * * * *